US012601606B2

(12) United States Patent (10) Patent No.: US 12,601,606 B2

Izumi et al. (45) Date of Patent: Apr. 14, 2026

(54) AUDIO OUTPUT DEVICE, AUDIO OUTPUT METHOD, PROGRAM AND STORAGE MEDIUM

(71) Applicant: PIONEER CORPORATION, Tokyo (JP)

(72) Inventors: Shota Izumi, Kawagoe (JP); Masahiro Iwata, Kawagoe (JP); Yohei Onuma, Kawagoe (JP); Kotaro Fukui, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 107 days.

(21) Appl. No.: 18/689,732

(22) PCT Filed: Oct. 29, 2021

(86) PCT No.: PCT/JP2021/039998

§ 371 (c)(1),
(2) Date: Mar. 6, 2024

(87) PCT Pub. No.: WO2023/073912

PCT Pub. Date: May 4, 2023

(65) Prior Publication Data

US 2025/0130059 A1 Apr. 24, 2025

(51) Int. Cl.
*G01C 21/36* (2006.01)
(52) U.S. Cl.
CPC ................................ *G01C 21/3629* (2013.01)
(58) Field of Classification Search
None
See application file for complete search history.

(56) References Cited

U.S. PATENT DOCUMENTS

| | | | | |
|---|---|---|---|---|
| 2005/0209776 A1* | 9/2005 | Ogino | ................ | G01C 21/3658 |
| | | | | 701/431 |
| 2008/0221792 A1* | 9/2008 | Nakayama | ......... | G01C 21/3655 |
| | | | | 701/431 |

(Continued)

FOREIGN PATENT DOCUMENTS

| | | |
|---|---|---|
| JP | H109886 A | 1/1998 |
| JP | H1054731 A | 2/1998 |
| JP | 2003057048 A | 2/2003 |

(Continued)

OTHER PUBLICATIONS

International Search Report for PCT/JP2021/039998, mailed Dec. 7, 2021, 7 pages.

(Continued)

*Primary Examiner* — Ryan Rink

(74) *Attorney, Agent, or Firm* — NIXON & VANDERHYE

(57) ABSTRACT

In a voice output device, the storage unit stores priority predetermined for each type of marks used in voice guidance at guidance points. The guidance voice generation unit determines the mark to be used for voice guidance at the guidance point based on the priority, for each of the guidance points included in a guide route of a mobile body, and generates guidance voice using the determined mark. The voice output unit outputs the generated guidance voice at an utterance point where the guidance voice for the guidance point is to be uttered.

6 Claims, 8 Drawing Sheets

(56) References Cited

U.S. PATENT DOCUMENTS

2011/0288766 A1* 11/2011 Nagasawa ............ G09B 29/106
                                          701/533
2022/0107200 A1* 4/2022 Sato ................... G01C 21/3629

FOREIGN PATENT DOCUMENTS

| | | | |
|---|---|---|---|
| JP | 2007285976 | A | 11/2007 |
| JP | 2008304342 | A | 12/2008 |
| JP | 2017138277 | A | 8/2017 |
| WO | 2009057207 | A1 | 5/2009 |

OTHER PUBLICATIONS

Written Opinion of the ISA for PCT/JP2021/039998, mailed Dec. 7, 2021, 4 pages.
Extended European Search Report, issued in European Patent Application No. 21962454.1 dated Apr. 4, 2025.

* cited by examiner

| TYPE OF MARKS | EXAMPLES OF MARKS |
|---|---|
| CONCRETE MARKS | TRAFFIC SIGNAL, INTERSECTION, STOP SIGN, CHARACTERISTIC ROAD SHAPE, BUILDING, LANDMARK, ETC. |
| CONCEPTUAL MARKS | DISTANCE, TIME, ETC. |

FIG. 6

| TYPE OF MARKS | EXAMPLES OF MARKS & PRIORITY |
|---|---|
| CONCRETE MARKS | 1. CHARACTERISTIC ROAD SHAPE<br>2. TRAFFIC SIGNAL<br>3. STOP SIGNE<br>4. BUILDING<br>5. INTERSECTION<br>· |
| CONCEPTUAL MARKS | WHEN NEXT GUIDANCE POINT IS FAR:<br>1. TIME  2. DISTANCE |
|  | WHEN NEXT GUIDANCE POINT IS NEAR:<br>1. DISTANCE  2. TIME |

"TURN RIGHT AT THIRD INTERSECTION"

"TURN RIGHT AFTER PASSING A TRAFFIC SIGNAL"

"TURN RIGHT AFTER PASSING TWO TRAFFIC SIGNALS"

AUDIO OUTPUT DEVICE, AUDIO OUTPUT METHOD, PROGRAM AND STORAGE MEDIUM

CROSS-REFERENCE TO RELATED APPLICATIONS

This application is the U.S. national phase of International Application No. PCT/JP2021/039998 filed Oct. 29, 2021 the entire contents of which are hereby incorporated by reference.

TECHNICAL FIELD

The present invention relates to route guidance by voice.

BACKGROUND ART

There is known a navigation device for mainly performing voice route guidance to a destination. For example, Patent Document 1 discloses a voice navigation system for notifying the approximate distance and orientation from the current location to the destination by increasing the spread of the sound field as the distance from the current location to the destination is small, and localizing the sound output from the speaker so that the sound is heard from the direction of the destination with respect to the head of the user.

PRECEDING TECHNICAL REFERENCES

Patent Document

Patent Reference 1: Japanese Patent Application Laid-open under 2017-138277

SUMMARY OF THE INVENTION

Problem to be Solved by the Invention

In the voice route guidance, various marks are utilized to correctly convey the guidance point to the user. In order to provide easy-to-understand guidance for users, it is desirable to preferentially use a mark that can uniquely identify a guidance point.

The present invention has been made to solve the problem as described above, and a main object thereof is to provide a voice output device capable of performing voice route guidance in an easy-to-understand manner for the user.

Means for Solving the Problem

One claimed invention is a voice output device comprising: a storage unit configured to store priority predetermined for each type of marks used in voice guidance at guidance points; a guidance voice generation unit configured to determine the mark to be used for voice guidance at the guidance point based on the priority, for each of the guidance points included in a guide route of a mobile body, and generate guidance voice using the determined mark; and a voice output unit configured to output the generated guidance voice at an utterance point where the guidance voice for the guidance point is to be uttered.

Another claimed invention is a voice output method comprising: determining a mark to be used for voice guidance at a guidance point, for each of the guidance points included in a guide route of a mobile body, based on priority predetermined for each type of marks used in the voice guidance at the guidance points; generating guidance voice using the determined mark; and outputting the generated guidance voice at an utterance point where the guidance voice for the guidance point is to be uttered.

Still another claimed invention is a program causing a computer to execute processing of:

determining a mark to be used for voice guidance at a guidance point, for each of the guidance points included in a guide route of a mobile body, based on priority predetermined for each type of marks used in the voice guidance at the guidance points;

generating guidance voice using the determined mark; and outputting the generated guidance voice at an utterance point where the guidance voice for the guidance point is to be uttered.

BRIEF DESCRIPTION OF THE DRAWINGS

FIG. 6 shows examples of a mark used for voice guidance in a second voice guidance method.

MODES FOR EXERCISING THE INVENTION

Figure 1:
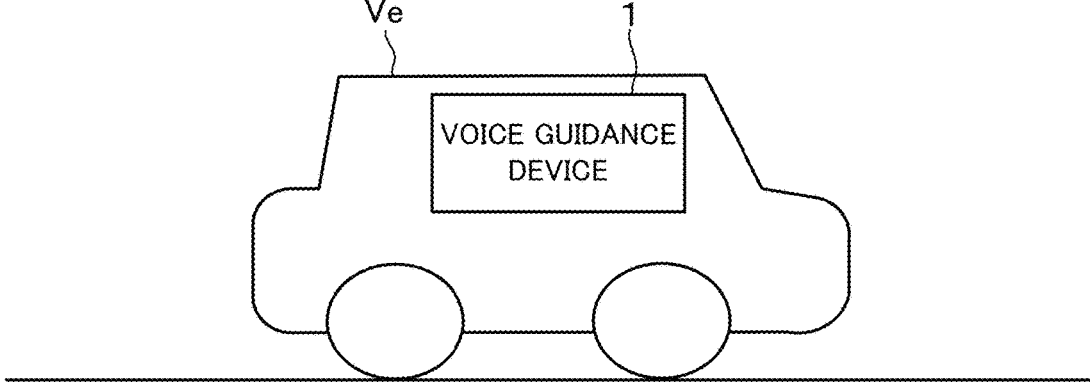
FIG. 1 shows a configuration example of a voice guidance system according to a first embodiment.

According to an aspect of the present invention, there is provided a voice output device comprising: a storage unit configured to store priority predetermined for each type of marks used in voice guidance at guidance points; a guidance voice generation unit configured to determine the mark to be used for voice guidance at the guidance point based on the priority, for each of the guidance points included in a guide route of a mobile body, and generate guidance voice using the determined mark; and a voice output unit configured to output the generated guidance voice at an utterance point where the guidance voice for the guidance point is to be uttered.

In the above voice output device, the storage unit stores priority predetermined for each type of marks used in voice guidance at guidance points. The guidance voice generation unit determines the mark to be used for voice guidance at the guidance point based on the priority, for each of the guidance points included in a guide route of a mobile body, and generates guidance voice using the determined mark. The voice output unit outputs the generated guidance voice at an utterance point where the guidance voice for the guidance point is to be uttered. Thus, it becomes possible to perform easy-to-understand guidance for the user by using marks of high priority in voice route guidance.

In one mode of the above voice output device, when the type of the mark is a concrete mark, the priority is set such that characteristic mark has higher priority. Thus, characteristic marks are preferentially used for voice guidance. In a preferred example, the priority is higher in an order of characteristic road shapes, traffic signals, stop signs, buildings, and intersections.

In another mode of the above voice output device, when the guidance voice generation unit uses time or distance as the mark, the guidance voice generation unit uses time in a case where a distance from a current position of the mobile body to the guidance point is equal to or longer than a predetermined value, and uses distance in other cases. In this mode, voice guidance is provided using time or distance in accordance with the distance from the current position of the mobile body to the guidance point.

In still another mode of the above voice output device, when a mark having higher priority than the mark existing at the guidance point exists before the guidance point when viewed from the current position of the mobile body, the guide voice generation unit generates the guidance voice using the mark having higher priority. In this mode, voice guidance is provided using the mark with higher priority.

According to another aspect of the present invention, there is provided a voice output method comprising: determining a mark to be used for voice guidance at a guidance point, for each of the guidance points included in a guide route of a mobile body, based on priority predetermined for each type of marks used in the voice guidance at the guidance points; generating guidance voice using the determined mark; and outputting the generated guidance voice at an utterance point where the guidance voice for the guidance point is to be uttered. Thus, it becomes possible to perform easy-to-understand guidance for the user by using marks of high priority in voice route guidance.

According to still another aspect of the present invention, there is provided a program causing a computer to execute processing of: determining a mark to be used for voice guidance at a guidance point, for each of the guidance points included in a guide route of a mobile body, based on priority predetermined for each type of marks used in the voice guidance at the guidance points; generating guidance voice using the determined mark; and outputting the generated guidance voice at an utterance point where the guidance voice for the guidance point is to be uttered. By executing the program by a computer, the above voice output device can be realized. This program can be used in a state stored in a storage medium.

EMBODIMENTS

Preferred embodiments of the present invention will be described with reference to the accompanying drawings.

First Embodiment

[System Configuration]

FIG. 1 illustrates a configuration example of a voice guidance system according to a first embodiment of the voice guidance device of the present invention. The voice guidance system includes a vehicle Ve and a voice guidance device 1.

The voice guidance device 1 moves with the vehicle Ve, and performs a route guidance mainly by voice so that the vehicle Ve travels along the route to be guided (hereinafter referred to as "guide route"). Incidentally, the "route guidance mainly by voice" refers to route guidance in which the user can obtain information necessary for driving the vehicle Ve along the guide route at least from the voice only, and it does not intend to exclude that the voice guidance device 1 supplementarily displays the map around the current position.

In this embodiment, the voice guidance device 1 outputs at least information relating to a point (also referred to as a "guidance point") on a route where guidance is necessary by voice. Here, for example, the guidance point includes intersections with the right/left turn of the vehicle Ve, and other important passing points for the vehicle Ve to travel along the guide route. The voice guidance device 1 performs voice guidance related to the travel at the next guidance point, at several places before the next guidance point. The point where the voice guidance is to be outputted is also referred to as a "utterance point". Also, the voice related to the guidance for the guide route is also called "route voice guidance".

Incidentally, the voice guidance device 1 may be an on-vehicle device mounted or attached to the vehicle Ve, or may be a portable terminal to be brought and utilized in a vehicle such as a smartphone. In yet another example, the voice guidance device 1 may be incorporated into the vehicle Ve. The voice guidance device 1 is an example of a "voice output device". Further, the vehicle Ve is an example of a "mobile body".

[Device Configuration]

Figures 2, 3:
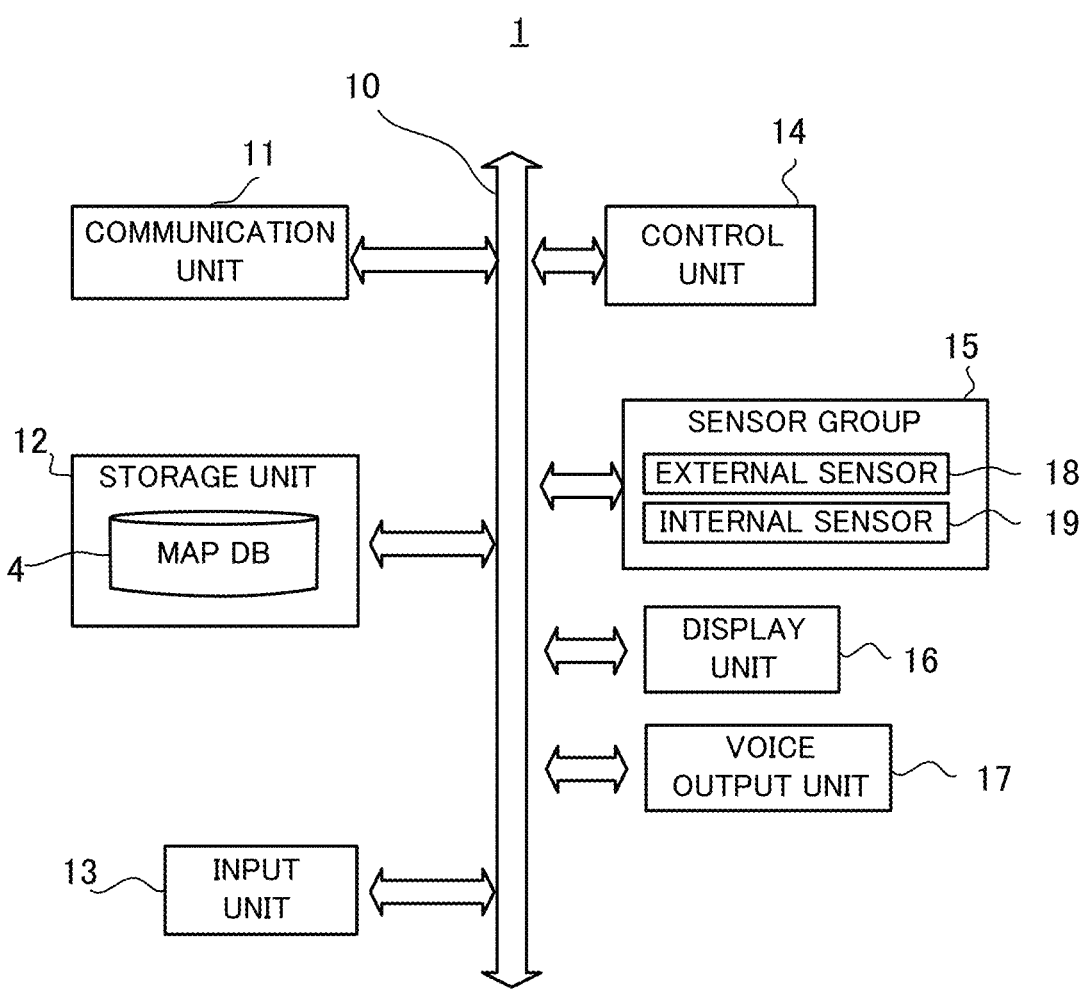
FIG. 2 shows an example of a schematic configuration of a voice guidance device.
FIG. 3 shows examples of a mark used for voice guidance in a first voice guidance method.

FIG. 2 shows an example of a schematic configuration of a voice guidance device 1. The voice guidance device 1 mainly includes a communication unit 11, a storage unit 12, an input unit 13, a control unit 14, a sensor group 15, a display unit 16, and a voice output unit 17. Each element in the voice guidance device 1 is connected to each other via a bus line 10.

The communication unit 11 performs data communication with the other terminals based on the control of the control unit 14. For example, the communication unit 11 may receive map data for updating the map DB (Database) 4 to be described later from a map management server (not shown).

The storage unit 12 is composed of various memories such as a RAM (Random Access Memory), a ROM (Read Only Memory), and a non-volatile memory (including a hard disk drive, a flash memory, and the like). The storage unit 12 stores a program for the voice guidance device 1 to execute predetermined processing. The above-described program may include an application program for performing the route guidance by voice, an application program for playing music, an application program for outputting content other than music (such as a TV), and the like. The storage unit 12 is also used as a work memory of the control unit 14. The program to be executed by the voice guidance device 1 may be stored in a storage medium other than the storage unit 12.

Further, the storage unit 12 stores the map DB 4. The map DB 4 stores various types of data required for the route guidance. The map DB 4 is a database that includes, for example, road data representing a road network by a combination of nodes and links, and facility data representing facilities that are candidates for a destination, stopover points, or landmarks. The map DB 4 may be updated based on the map information that the communication unit 11 receives from the map management server under the control of the control unit 14.

The input unit 13 is a button, a touch panel, a remote controller, a voice input device, or the like for the user to operate. The display unit 16 is a display or the like for performing display under the control of the control unit 14. The voice output unit 17 is a speaker or the like for outputting sound under the control of the control unit 14.

The sensor group 15 includes an external sensor 18 and an internal sensor 19. The external sensor 18 may be one or more sensors for recognizing the surrounding environment of the vehicle Ve such as a camera, a lidar, a radar, an ultrasonic sensor, an infrared sensor, a sonar, and the like. The internal sensor 19 is a sensor for positioning the vehicle Ve, for example, a GNSS (Global Navigation Satellite System) receiver, a gyroscopic sensor, IMU (Inertial Measurement Unit), a vehicle speed sensor, or a combination thereof. The sensor group 15 may have a sensor by which the control unit 14 can directly or indirectly (i.e., by performing the estimation process) derive the position of the vehicle Ve from the output of the sensor group 15.

The control unit 14 includes a CPU (Central Processing Unit), a GPU (Graphics Processing Unit), and the like, and controls the entire voice guidance device 1. For example, based on the output of one or more sensors of the sensor group 15, the control unit 14 estimates the position of the vehicle Ve (including the direction of the traveling direction). Further, when the destination is designated by the input unit 13, the control unit 14 generates a route information indicating a guide route to the destination, and performs the route guidance based on the route information, the estimated position information of the vehicle Ve, and the map DB 4. In this case, the control unit 14 controls the voice output unit 17 to output the voice guidance. Further, the control unit 14 controls the display unit 16 to display the information of the music being played, video contents, or a map around the current position. The control unit 14 is an example of an utterance point determination unit and a guide voice generation unit.

Incidentally, the processing executed by the control unit 14 is not limited to be realized by software by a program, and it may be realized by any combination of hardware, firmware, and software. The process executed by the control unit 14 may be realized by an integrated circuit that can be programmed by the user, for example, a FPGA (field-programmable gate array) or a microcomputer. In this case, a program that the control unit 14 implements in this embodiment may be realized by the integrated circuit. Thus, the control unit 14 may be realized by hardware other than the processor.

The configuration of the voice guidance device 1 shown in FIG. 2 is merely an example, and various changes may be made to the configuration shown in FIG. 2. For example, instead of storing the map DB 4 in the storage unit 12, the control unit 14 may receive information required for the route guidance through the communication unit 11 from the map management server (not shown). In another example, instead of providing the voice output unit 17, the voice guidance device 1 may be connected, electrically or by known communication means, to a different voice output unit which is configured separately from the voice guidance device 1, and the different voice output unit may output the sound. In this case, the different voice output unit may be a speaker provided in the vehicle Ve. In yet another example, the voice guidance device 1 may not include a display unit 16. In this case, the voice guidance device 1 may not perform any control relating to the display. Alternatively, by electrically connecting to the display unit provided in the vehicle Ve or the like by a wired or wireless connection, the voice guidance device 1 may make the display unit execute a predetermined display. Similarly, instead of including the sensor group 15, the voice guidance device 1 may acquire information outputted by the sensors attached to the vehicle Ve from the vehicle Ve, based on a communication protocol such as CAN (Controller Area Network).

[Voice Guidance Method]

Next, a detailed description of the voice guidance method by the voice guidance device 1 will be described.

(First Voice Guidance Method)

(1) Voice Guidance Method

First, a description will be given of a first voice guidance method. In the first voice guidance method, the voice guidance device 1 performs voice guidance using the marks of the same type for each guidance point on the guide route. For example, when the voice guidance is performed at three utterance points before a certain guidance point, the voice guidance device 1 uses the marks of one type at all three utterance points in a unified manner. Incidentally, when the voice guidance is performed at three utterance points before a certain guidance point, the voice guidance device 1 performs the voice guidance four times in total, including the final voice guidance at the certain guidance point.

FIG. 3 shows examples of marks used for voice guidance in the first voice guidance method. The voice guidance uses marks to correctly convey the guidance point to the user only by voice. The marks used for the voice guidance can be classified into two types: concrete marks and conceptual marks. As shown in FIG. 3, concrete marks include traffic signals, intersections, stop signs, characteristic road shapes, buildings, landmarks, and the like. Note that "characteristic road shapes" refer to T-junctions, Y-junctions, five-way intersections, or the like, other than ordinary crossroads. On the other hand, conceptual marks include distance, time, etc.

Figure 4:
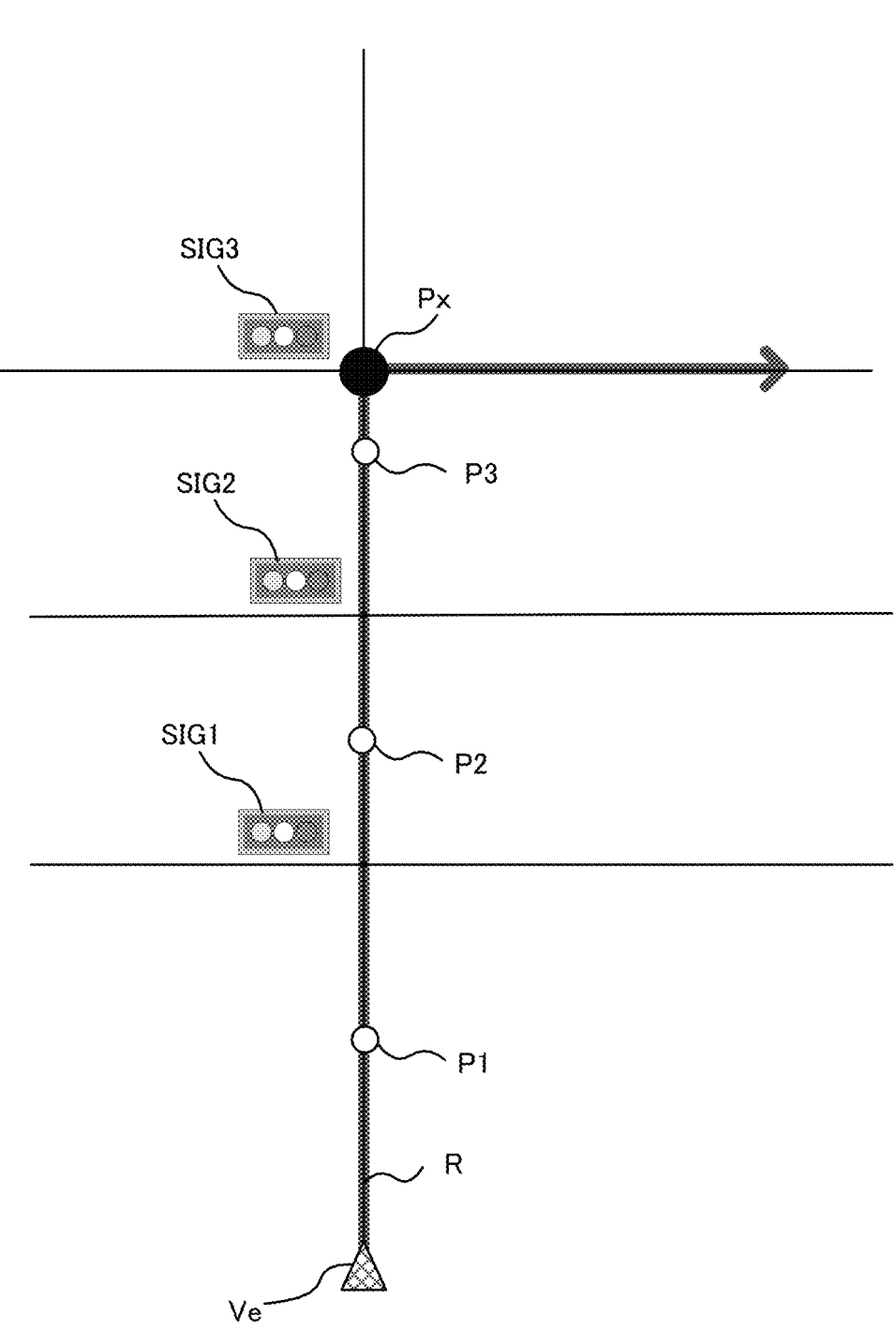
FIG. 4 is a diagram for explaining an example of voice guidance for a certain guidance point.

In the first voice guidance method, the voice guidance device 1 unifiedly uses one of the concrete marks and the conceptual marks for each guidance point. FIG. 4 is a diagram for explaining an example of voice guidance for a certain guidance point. In the example of FIG. 4, the vehicle Ve is traveling on the guide route R. On the guide route R, the next guidance point is Px, and the voice guidance device 1 performs voice guidance of turning right at the next guidance point Px. In the example of FIG. 4, it is assumed that the voice guidance device 1 performs voice guidance at the utterance point P1 which is 200 m in front of the guidance point Px, the utterance point P2 which is 100 m in front of the guidance point Px, the utterance point P3 which is 30 m in front of the guidance point Px, and the guidance point Px.

In the example of FIG. 4, there are traffic signals SIG1 to SIG3 at the intersections between the current position of the vehicle Ve and the next guidance point Px. Therefore, the voice guidance device 1 performs the voice guidance at the respective utterance points P1 to P3 using the traffic signals which belong to the concrete marks. For example, the voice guidance device 1 speaks "Turn right at the third traffic signal" at the utterance point P1, and speaks "Turn right at the second traffic signal" at the utterance point P2. In addition, the voice guidance device 1 speaks "Turn right at the next traffic signal" at the utterance point P3, and speaks "Turn right at this traffic signal" at the guidance point Px.

If the traffic signals SIG1 to SIG3 do not exist in the example of FIG. 4, the voice guidance device 1 may perform voice guidance using the intersections which belong to the concrete marks. For example, the voice guidance device 1 speaks "Turn right at the third intersection" at the utterance point P1, speaks "Turn right at the second intersection" at the utterance point P2, speaks "Turn right at the next intersection" at the utterance point P3, and speaks "Turn right at this intersection" at the guidance point Px.

Further, even if there is no traffic signal or intersection before the next guidance point Px, if there are buildings or landmarks, the voice guidance device 1 performs voice guidance at the respective utterance points using buildings or landmarks which belong to the concrete marks. While only the traffic signals or the intersections are used in the above example, different concrete marks may be used in combination. For example, the voice guidance device 1 may perform voice guidance using a landmark at the utterance point P1, perform voice guidance using an intersection at the utterance point P2, perform voice guidance using the intersection at the utterance point P3 and the guidance point Px. That is, it is sufficient that the marks to be used for a plurality of voice guidance related to one guidance point Px is unified to the concrete marks.

On the other hand, if there is no concrete mark from the current position of the vehicle Ve to the next guidance point Px, the voice guidance device 1 performs voice guidance using the conceptual marks such as distance or time. For example, the voice guidance device 1 speaks "Turn right after 200 m" at the utterance point P1, speaks "Turn right after 100 m" at the utterance point P2, and speaks "Turn right after 30 m" at the utterance point P3.

Figure 5:
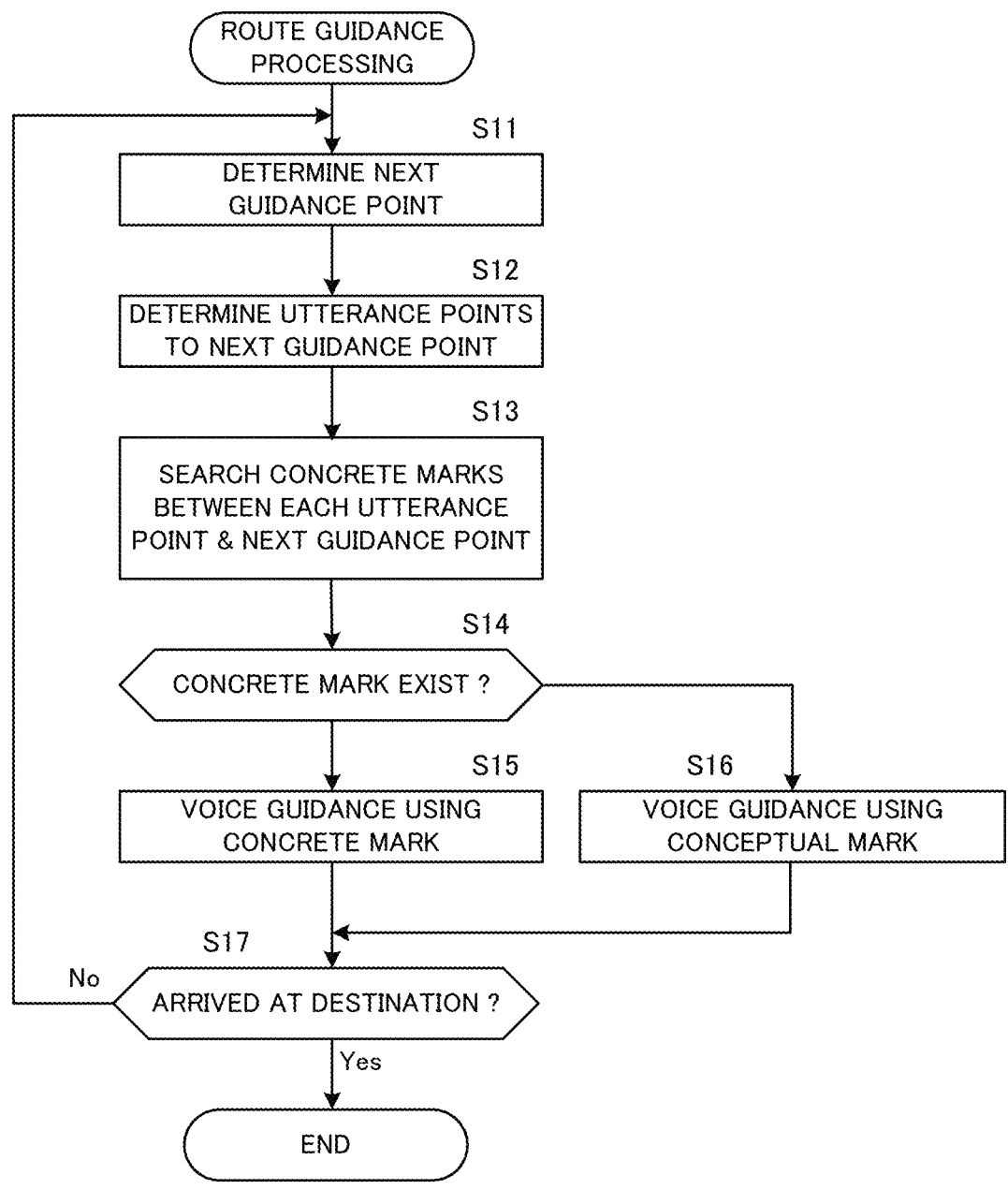
FIG. 5 is a flowchart of route guidance processing by the first voice guidance method.

Thus, by unifiedly using one of the concrete marks and the conceptual marks at multiple utterance points associated with one guidance point, easy-to-understand guidance for the user is possible only by voice.
(2) Route Guidance Processing FIG. 5 is a flowchart of route guidance processing by the first voice guidance method. This processing is realized by the control unit 14 shown in FIG. 2, which executes a program prepared in advance. It is assumed that, when the processing of FIG. 5 is executed, the route search to the destination designated by the user has already been performed and the guide route has already been set.

First, the control unit 14 determines the next guidance point based on the set the guide route and the current position of the vehicle Ve (step S11). Next, the control unit 14 determines the utterance points to the next guidance point (step S12). For example, the control unit 14 determines the points of predetermined distances to the next guidance point (e.g., 200 m front, 100 front, 30 m front) to be the utterance points, as described above.

Next, the control unit 14 refers to the map DB 4 and searches for concrete marks between the respective utterance points determined in step S12 and the next guidance point (step S13). If there is a concrete mark between at least one utterance point and the next guidance point (step S14: Yes), the control unit 14 generates voice guidance using the concrete mark found by the search, and outputs the voice guidance (step S15). On the other hand, if there is no concrete mark for any of the utterance points (step S14: No), the control unit 14 generates voice guidance using the conceptual mark and outputs the voice guidance (step S16). Thus, at each utterance point to the next guidance point, the voice guidance is performed in a unified manner using either concrete marks or conceptual marks.

Next, the control unit 14 determines whether or not the vehicle Ve has arrived at the destination (step S17). If the vehicle Ve has not arrived at the destination (step S17: No), the process returns to step S11 and repeats steps S11 to S16 for the next guidance point. On the other hand, if the vehicle Ve has arrived at the destination (step S17: Yes), the route guidance processing ends.

(3) Modifications

In the above example, if it is determined in step S14 of FIG. 5 that there is a concrete mark between the next guidance point and at least one utterance point among the plurality of utterance points to the next guidance point, the voice guidance device 1 perform the voice guidance using the concrete mark. In this case, for the utterance point for which a concrete mark was not found between the next guidance point, the voice guidance device 1 may perform voice guidance using a concrete mark to be used in the utterance point beyond that utterance point. For example, it is assumed that a first utterance point exists 100 m in front of a certain guidance point and a second utterance point exists 30 m in front of the certain guidance point, and that there is no concrete mark between the first utterance point and the second utterance point. In this case, if there is a concrete mark (referred to as mark X) between the second utterance point and the next guidance point, the voice guidance device 1 may perform voice guidance using the mark X at both the first utterance point and the second utterance point.

Instead, the voice guidance device 1 may perform voice guidance using a concrete mark when a concrete mark is found between the next guidance point and a predetermined number of or all of the utterance points before the next guidance point, and may perform voice guidance using a conceptual mark in other cases.

Further, instead of determining whether or not there is a concrete mark in step S14 of FIG. 5, the voice guidance device 1 may determine whether the current position of the vehicle Ve is an urban area or a suburban area. Usually, there are many concrete marks in urban districts, but there are few concrete marks in suburbs. Therefore, the voice guidance device 1 may perform voice guidance using concrete marks when the current position of the vehicle Ve is an urban district, and may perform voice guidance using conceptual marks when the current position of the vehicle Ve is in suburbs.
(Second Voice Guidance Method)
(1) Voice Guidance Method Next, a description will be given of a second voice guidance method. In the second voice guidance method, the voice guidance device 1 determines the marks to be used, for each guidance points on the guide route, based on the priority predetermined for each type of mark, and performs voice guidance at each utterance point.

FIG. 6 shows examples of marks used for voice guidance in the second voice guidance method. In the second voice guidance method, similarly to the first voice guidance method, the voice guidance is performed using marks in order to correctly convey the guidance points to the user only by voice. The marks used for the voice guidance can be classified into two types: concrete marks and conceptual marks. In the second voice guidance method, as shown in FIG. 6, the priority of each mark is determined in advance for each of the concrete marks and the conceptual marks.

In the example of FIG. 6, the priority of the concrete marks is in the order of characteristic road shapes, traffic signals, stop signs, buildings, and intersections. This priority is predetermined in such an order that a driver generally considers easy to recognize as a mark. In other words, rare, unique, and unusual marks are determined to have higher priority. As mentioned above, "characteristic road shapes" refer to T-junctions, Y-junctions, five-way intersections, etc., other than ordinary crossroads.

As for conceptual marks, priority is determined based on the distance between the current position of the vehicle Ve and the next guidance point. When the next guidance point is far from the current position of the vehicle Ve, the priority of the marks are in the order of time and distance. On the other hand, when the next guidance point is near the current position of the vehicle Ve, the priority of the marks are in the order of distance and time. This is because, as a general human feeling, when the distance to the guidance point is long, it is easier to recognize the positional relationship with the guidance point by the expression using time, and when the distance to the guidance point is short, it is easier to recognize the positional relationship with the guidance point by the expression using distance.

Thus, in the second voice guidance method, when performing the voice guidance using a concrete mark for the next guidance point, the voice guidance device 1 performs the guidance by selecting the concrete marks based on the predetermined priority such as characteristic road shapes, traffic signals, . . . as shown in FIG. 6. For example, when there are both a characteristic road shape and a traffic signal between a certain utterance point and the next guidance point, the voice guidance device 1 performs the voice guidance using the characteristic road shape based on the priority of FIG. 6.

Further, in the second voice guidance method, when performing voice guidance using conceptual marks for the next guidance point, the voice guidance device 1 performs voice guidance in the priority corresponding to the distance to the next guidance point as shown in FIG. 6. Specifically, when the distance to the next guidance point is longer than a predetermined distance, the voice guidance device 1 performs voice guidance using the time such as "Turn right after about 5 minutes". Also, when the distance to the next guidance point is shorter than the predetermined distance, the voice guidance device 1 performs voice guidance using the distance such as "Turn right after 200 m".

Figure 7:
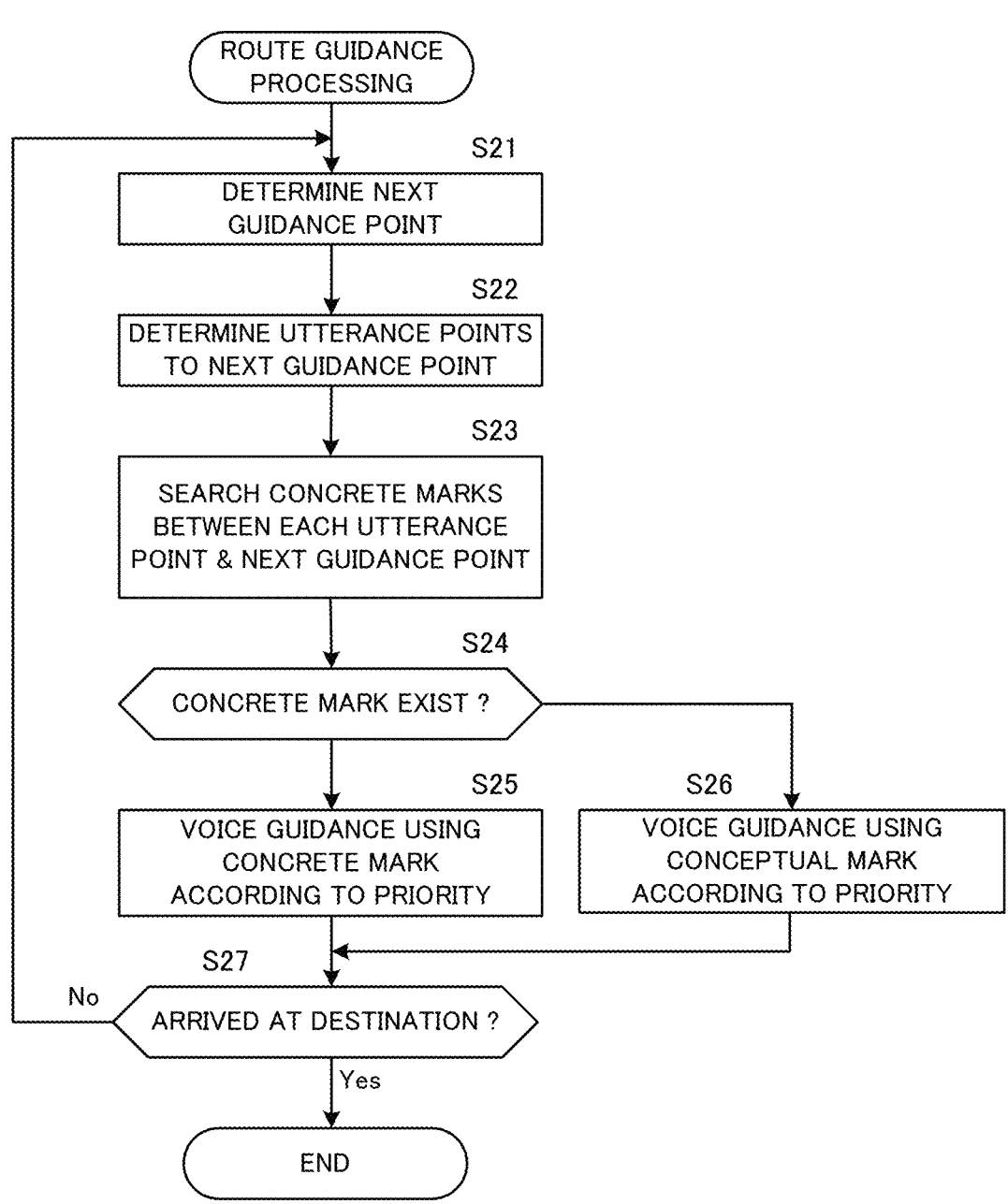
FIG. 7 is a flowchart of route guidance processing by the second voice guidance method.

Thus, by performing voice guidance by determining the marks to be used according to the priority predetermined for the concrete marks and the conceptual mark, respectively, easy-to-understand guidance for the user becomes possible.
(2) Route Guidance Processing FIG. 7 is a flowchart of route guidance processing by the second voice guidance method. This processing is realized by the control unit 14 shown in FIG. 2, which executes a program prepared in advance. The basic flow of the route guidance processing by the second voice guidance method is the same as the route guidance processing by the first voice guidance method shown in FIG. 5. Specifically, steps S21 to S24 are similar to steps S11 to S14 of FIG. 5, and step S27 is similar to step S17 of FIG. 5.

In step S25, the control unit 14 selects one concrete mark from the concrete marks found by the search according to the priority illustrated in FIG. 6, and generates and outputs voice guidance using the concrete mark (step S25). In step S26, the control unit 14 compares the distance between the current position of the vehicle Ve and the next guidance point with a predetermined distance. The control unit 14 generates and outputs voice guidance using time when the next guidance point is farther than the predetermined distance, and generates and outputs voice guidance using distance when the next guidance point is nearer than the predetermined distance. Thus, at each utterance point to the next guidance point, voice guidance is performed using the marks selected from the concrete marks and the conceptual marks according to a predetermined priority.
(3) Modifications When voice guidance is performed using concrete marks by the second voice guidance method, there may be a case where no concrete mark of high priority such as a characteristic road shape and a traffic signal does not exist at the guidance point. In this case, if there is a concrete mark of higher priority on the guide route before the guidance point, the voice guidance device 1 may perform voice guidance using the concrete mark.

Figure 8A:
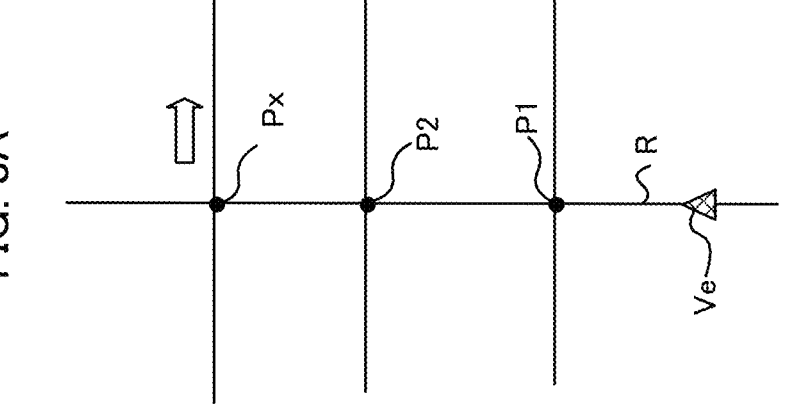
FIGS. 8A to 8C show examples of guidance in a case where a concrete mark having high priority does not exist at a guidance point.

FIG. 8 shows an example of guidance in the case where there is no concrete mark of high priority at the guidance point. In the example of FIG. 8A, the vehicle Ve is traveling on the guide route R, and the third intersection is the guidance point Px. The intersections P1 and P2 exist before the guidance point Px, but no traffic signal exists at the intersections P1 and P2. In this case, since there is no concrete mark of higher priority than the intersection, the voice guidance device 1 performs voice guidance using the intersections P1 and P2 before the guidance point Px. For example, the voice guidance device 1 outputs voice guidance "Turn right at the third intersection."

Figure 8B:
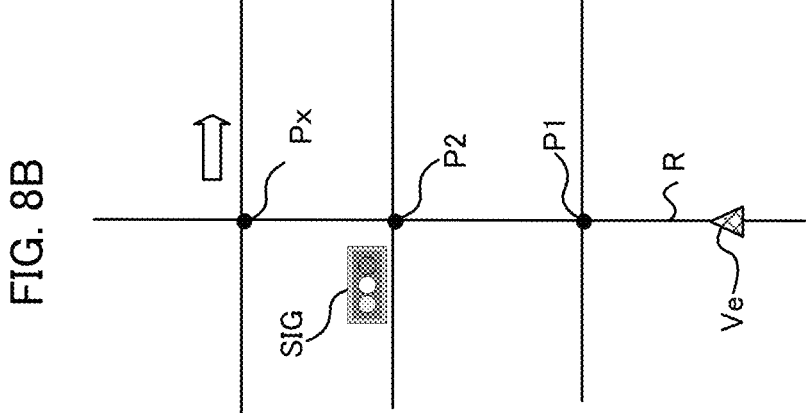

Also in the example of FIG. 8B, the vehicle Ve is traveling along the guide route R, and the third intersection is the guidance point Px. While there is no traffic signal at the guidance point Px, there are intersections P1 and P2 before the guidance point Px and there is a traffic signal at the intersection P2. In this instance, the voice guidance device 1 performs voice guidance using a traffic light having a higher priority than the intersection, i.e., the traffic signal at the intersection P2 before the guidance point Px. For example, the voice guidance device 1 outputs, at the utterance point P1, voice guidance "Turn right after passing a traffic signal", instead of "Turn right at the third intersection".

Figure 8C:
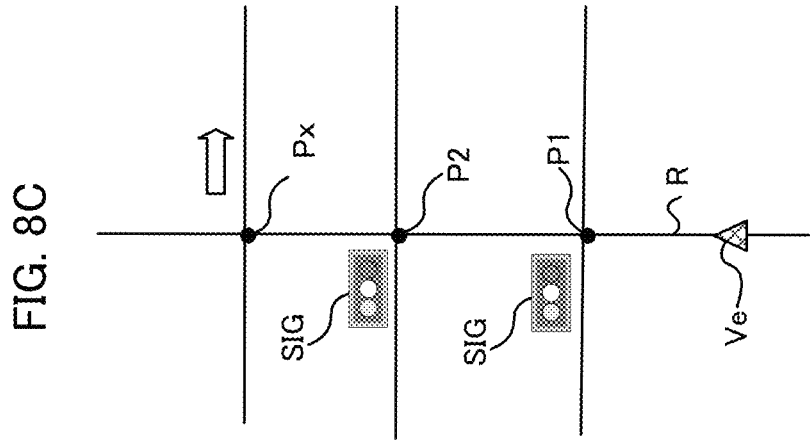

In the example of FIG. 8C, the vehicle Ve is traveling along the guide route R, and the third intersection is the guidance point Px. While there is no traffic signal at the guidance point Px, there are intersections P1 and P2 before the guidance point Px and there are traffic signals at the intersections P1 and P2. In this instance, the voice guidance device 1 performs voice guidance using a traffic signal having higher priority than the intersection, i.e., the traffic signals at the intersections P1 and P2 before the guidance point Px. For example, the voice guidance device 1 outputs, at the utterance point P1, voice guidance "Turn right after passing two traffic signals", instead of "Turn right at the third intersection".

Second Embodiment

Figure 9:
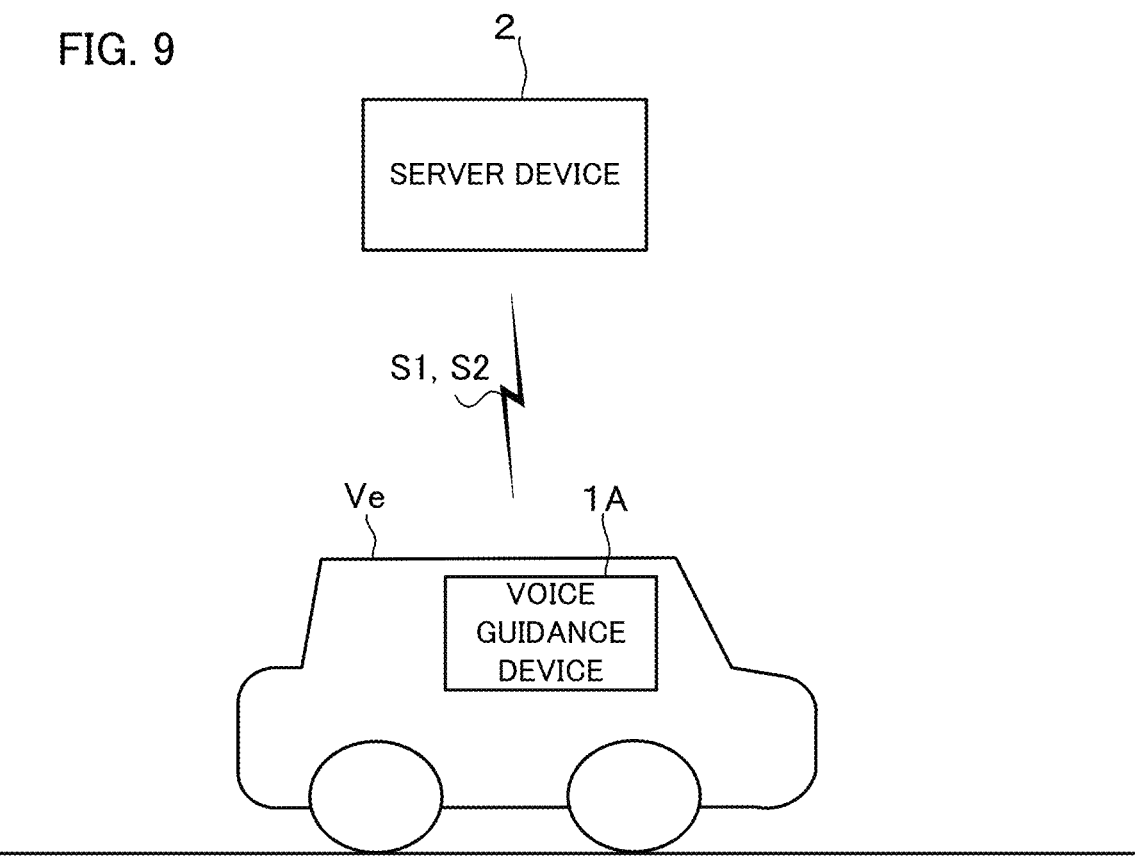
FIG. 9 is a configuration example of a voice guidance system according to a second embodiment.

FIG. 9 is a configuration example of a voice guidance system according to the second embodiment. The voice guidance system according to the second embodiment mainly includes a vehicle Ve, a voice guidance device 1A, and a server device 2. Incidentally, the same components as in the first embodiment are appropriately denoted by the same reference numerals as the components of the first embodiment, and the description thereof will be omitted.

The voice guidance device 1A has the same configuration as the voice guidance device 1 described in the first embodiment described above (see FIG. 2). In the second embodiment, since the server device 2 performs the route search processing and the route guidance processing based on the map DB 4, the voice guidance device 1A may not have a map DB. Then, when the voice guidance device 1A detects the input by the user designating the destination or the like via the input unit 13, the voice guidance device 1A transmits the upload signal "S1" including the position information of the vehicle Ve outputted by the sensor group 15 and the information related to the designated destination to the server device 2.

The server device 2 generates a route information indicating a guide route to be traveled by the vehicle Ve based on the upload signal S1 including the destination or the like received from the voice guidance device 1A. Then, the server device 2 executes the route guidance processing by the first voice guidance method shown in FIG. 5 or the second voice guidance method shown in FIG. 7 using the generated route information and the position information of the vehicle Ve included in the upload signal S1 received from the voice guidance device 1A. Incidentally, in steps S15, S16 in FIG. 5 and steps S25, S26 in FIG. 7, the server device 2 transmits the generated guidance voice to the voice guidance device 1A as a control signal S2, and makes the voice guidance device 1A output the guidance voice. Thus, voice guidance by the first or second voice guidance method is performed.

Figure 10:
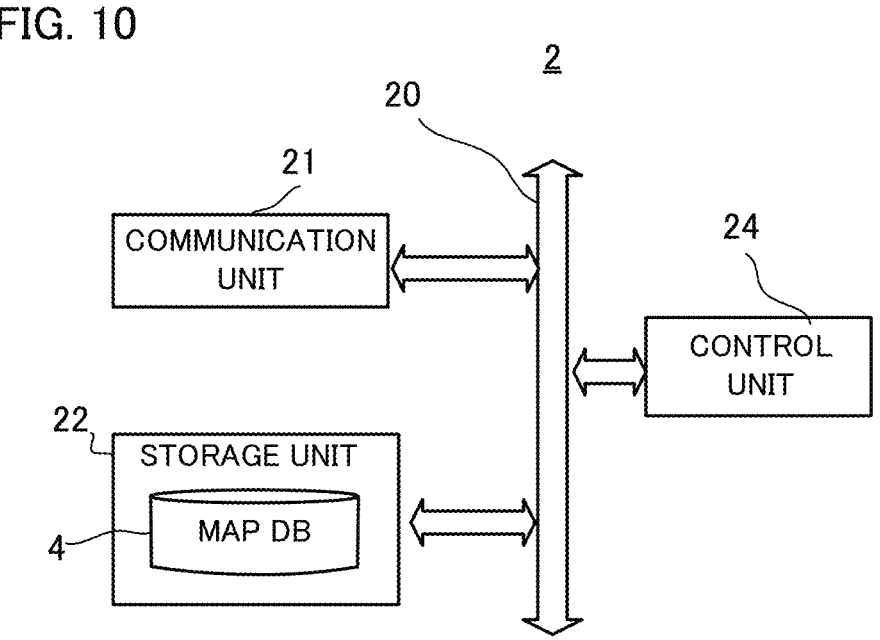
FIG. 10 shows an example of a schematic configuration of a server device.

FIG. 10 shows an example of a schematic configuration of the server device 2. The server device 2 mainly includes a communication unit 21, a storage unit 22, and a control unit 24. Each element in the server device 2 is interconnected via a bus line 20.

The communication unit 21 performs data communication with an external device such as the voice guidance device 1A under the control of the control unit 24. The storage unit 22 is composed of various memories such as a RAM, a ROM, and a non-volatile memory (including a hard disk drive, a flash memory, and the like). The storage unit 22 stores a program for the server device 2 to execute a predetermined processing. Further, the storage unit 22 includes a map DB 4. The control unit 24 includes a CPU, a GPU, and the like, and controls the entire server device 2. Also, the control unit 24 executes the route guidance processing shown in FIG. 5 or FIG. 7 by executing a program stored in the storage unit 22.

As described above, even when the server device 2 substantially controls the voice guidance device 1A related to the route guidance, the voice guidance system can perform voice guidance using concrete marks or conceptual marks based on the first or second voice guidance method similarly to the first embodiment. In the second embodiment, the server device 2 is an example of a "voice guidance device".

In the embodiments described above, the program may be stored using various types of non-transitory computer-readable medium and can be supplied to a control unit or the like that is a computer. The non-transitory computer-readable medium includes a storage medium (tangible storage medium) of various types of entities. Examples of the non-transitory computer-readable medium include a magnetic storage medium (e.g., a flexible disk, a magnetic tape, a hard disk drive), a magnetooptical storage medium (e.g., a magnetooptical disk), a CD-ROM (Read Only Memory), a CD-R, a CD-R/W, a solid-state memory (e.g., a mask ROM, a PROM (Programmable ROM), an EPROM (an Erasable PROM, a flash ROM, a RAM (Random Access Memory)).

While the present invention has been described with reference to the embodiments, the present invention is not limited to the above embodiments. Various changes that can be understood by those skilled in the art within the scope of the present invention can be made in the configuration and details of the present invention. In other words, it is needless to say that the present invention includes various modifications and modifications that could be made by a person skilled in the art according to the entire disclosure, including the scope of the claims, and the technical philosophy. In addition, each disclosure of the above-mentioned patent documents, etc. cited shall be incorporated with reference to this document.

BRIEF DESCRIPTION OF REFERENCE NUMBERS

1 Voice guidance device
2 Server device
4 Map DB
11, 21 Communication unit
12, 22 Storage unit
13 Input unit
14, 24 Control unit
15 Sensor group
16 Display unit
17 Voice output unit.

The invention claimed is:

1. A voice output device comprising:
   a storage configured to store priority predetermined for each type of marks used in voice guidance at guidance points;
   a memory configured to store instructions; and
   a processor configured to execute the instructions to:
      determine the mark to be used for voice guidance at the guidance point based on the priority, for each of the guidance points included in a guide route of a mobile body, and generate guidance voice using the determined mark; and
      output the generated guidance voice at an utterance point where the guidance voice for the guidance point is to be uttered,
   wherein, when the processor uses time or distance as the mark, the processor uses time in a case where a distance from a current position of the mobile body to the guidance point is equal to or longer than a predetermined value, and uses distance in other cases.

2. The voice output device according to claim 1, wherein, when the type of the mark is a concrete mark, the priority is set such that characteristic mark has higher priority.

3. The voice output device according to claim 2, wherein the priority is higher in a descending order of priority of: characteristic road shapes, traffic signals, stop signs, buildings, and intersections.

4. The voice output device according to claim 1, wherein, when a mark having higher priority than the mark existing at the guidance point exists before the guidance point when viewed from the current position of the mobile body, the processor generates the guidance voice using the mark having higher priority.

5. A voice output method comprising:
   determining a mark to be used for voice guidance at a guidance point, for each of the guidance points included in a guide route of a mobile body, based on priority predetermined for each type of marks used in the voice guidance at the guidance points;
   generating guidance voice using the determined mark; and
   outputting the generated guidance voice at an utterance point where the guidance voice for the guidance point is to be uttered,
   wherein, when time or distance is used as the mark, time is used in a case where a distance from a current position of the mobile body to the guidance point is equal to or longer than a predetermined value, and distance is used in other cases.

6. A non-transitory computer-readable medium causing a computer to execute processing of:

determining a mark to be used for voice guidance at a guidance point, for each of the guidance points included in a guide route of a mobile body, based on priority predetermined for each type of marks used in the voice guidance at the guidance points;

generating guidance voice using the determined mark; and outputting the generated guidance voice at an utterance point where the guidance voice for the guidance point is to be uttered, wherein, when time or distance is used as the mark, time is used in a case where a distance from a current position of the mobile body to the guidance point is equal to or longer than a predetermined value, and distance is used in other cases.

\* \* \* \* \*